United States Patent

Wada et al.

[15] 3,673,352

[45] June 27, 1972

[54] MAGNETIC HEAD ASSEMBLY

[72] Inventors: Yoshiyo Wada; Hisao Kinjo, both of Yokohama; Toshi Suzuki, Kamakura; Fumio Akuwa, Yokohama, all of Japan

[73] Assignee: Victor Company of Japan, Ltd., Yokohama, Japan

[22] Filed: July 9, 1970

[21] Appl. No.: 53,552

[30] Foreign Application Priority Data

July 11, 1969 Japan....................................44/54578

[52] U.S. Cl.................179/100.2 C, 178/6.6 A, 179/100.2 P, 340/174.1 F, 179/100.2 CA

[51] Int. Cl..........................................G11b 5/10, G11b 5/58

[58] Field of Search..............................179/100.2 C, 100.2 P; 340/174.1 E, 174.1 F; 346/74 MC; 178/6.6 A

[56] References Cited

UNITED STATES PATENTS

| | | | |
|---|---|---|---|
| 3,249,701 | 5/1966 | Silver | 179/100.2 P |
| 3,311,711 | 3/1967 | Maryatt et al. | 340/174.1 F |
| 3,349,384 | 10/1967 | Kohn | 179/100.2 P |

*Primary Examiner*—Bernard Konick
*Assistant Examiner*—Steven B. Pokotilow
*Attorney*—Louis Bernat

[57] ABSTRACT

A magnetic head assembly comprises at least one resilient film-like member held in tension over a drum-shaped support. A magnetic head holder and at least one head core are provided on an upper resilient member. The head core can follow the variation of contact caused by an uneveness of the magnetic surface of a magnetic medium.

13 Claims, 21 Drawing Figures

INVENTOR.
YOSHIYO WADA
HISAO KINJO
TOSHI SUZUKI
FUMIO AKUWA

BY

Lorus Bonnat

FIG. 3A
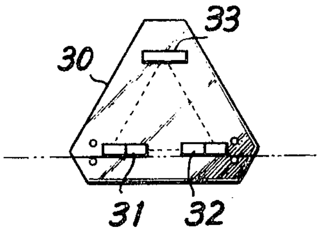
FIG. 3B
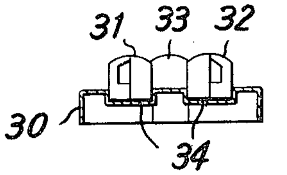
FIG. 3C
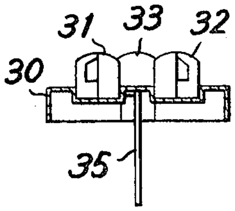
FIG. 3D
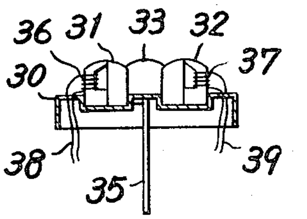
FIG. 3E
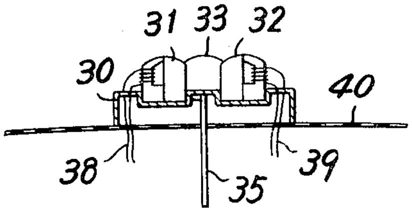
FIG. 3F
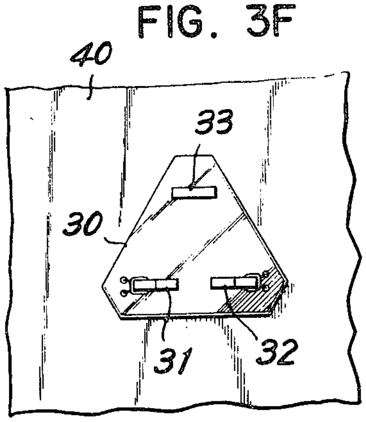
FIG. 3H
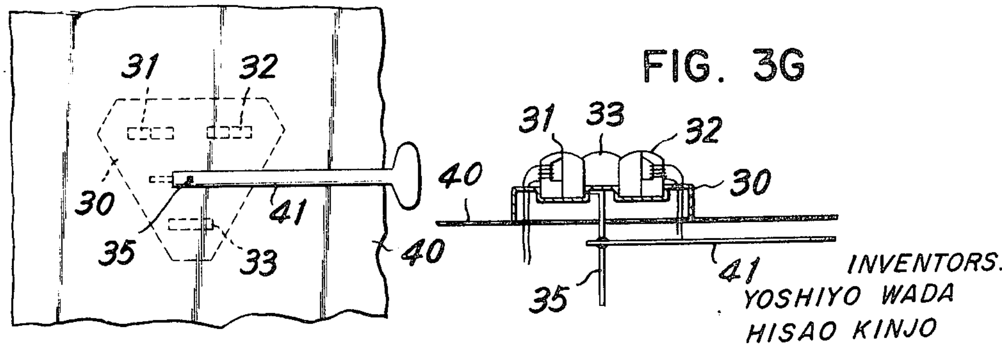
FIG. 3H, FIG. 3G
INVENTORS.
YOSHIYO WADA
HISAO KINJO
TOSHI SUZUKI
FUMIO AKUWA
BY

INVENTORS.
YOSHIYO WADA
HISAO KINJO
TOSHI SUZUKI
FUMIO AKUWA

BY

INVENTORS.
YOSHIYO WADA
HISAO KINJO
TOSHI SUZUKI
FUMIO AKUWA

BY

INVENTORS.
YOSHIYO WADA
HISAO KINJO
TOSHI SUZUKI
FUMIO AKUWA

BY

INVENTORS.
YOSHIYO WADA
HISAO KINJO
TOSHI SUZUKI
FUMIO AKUWA

BY

INVENTORS.
YOSHIYO WADA
HISAO KINJO
TOSHI SUZUKI
FUMIO AKUWA

BY

MAGNETIC HEAD ASSEMBLY

This invention relates to magnetic head assemblies, and more particularly to the structure of an assembly of a magnetic head which makes contact, at a high relative speed, with a rotating or running magnetic medium in a magnetic recording and reproducing apparatus.

In a magnetic recording and reproducing apparatus using a rotary magnetic medium such as, for example, a rotary magnetic disk or a rotary magnetic sheet, a magnetic head has been provided at the forward end of an arm. Ordinarily, this conventional magnetic head is rigidly fixed at the forward end of an arm. An end of the arm is pivoted rotatably upwardly and downwardly to insure contact with the medium, Or, the head may be resiliently carried at the forward end of an arm having the other fixed end. The head makes contact with the rotary magnetic medium in a conventional way.

Generally, this sort of rotary motion is apt to generate oscillations of the surface of the magnetic medium during rotation, even though such oscillations may be just a slight amount. The oscillation would appear responsive to an error in the attachment of magnetic medium to the rotary shaft, a curvature of the surface of the magnetic medium, or similar non-planar characteristics of the magnetic medium. The rotary magnetic medium may also have slight irregularities resulting from inaccuracy of finishing during its manufacture. Thus, the magnetic head is often subjected to oscillation due to irregularities on the surface where it is making contact with the rotary magnetic medium. Consequently, a good contact could not be obtained between the magnetic head and the magnetic medium.

With the arm pivoted or held resiliently, as hereinabove described, the magnetic head can follow the surface oscillation to some extent if such oscillation occurs less frequently, such as once in a rotation of the magnetic medium. Such surface oscillation has a magnitude in the order of several $\mu$ to 1 mm. However, if the oscillations are caused by irregularities on the surface of the magnetic medium, the head cannot follow the oscillations very well when the magnetic head must depend on only the rotation or resiliency of the arm, because the frequency of oscillation is extremely high.

In particular, the magnetic recording and reproducing apparatus magnetically records and reproduces a video signal. For example, the magnetic head may record a signal of one field of video signal during one rotation of the magnetic medium. In this instance, the rotary magnetic medium is rotated at a high speed such as 60 revolutions in a second. Accordingly, when a rotary magnetic sheet of a diameter 50 cm would rotate at a speed of 60 revolutions per second, the surface irregularities would be about 0.3 mm in magnitude and recur at about 3 KHz in frequency. In case a rotary magnetic sheet of a flexible material, such as a thin mylar sheet, is used for a rotary magnetic medium, the sheet surface also has wave-like irregularities due to unbalance in the inner stress of the sheet, in rotation, in addition to the proper irregularities of the sheet surface.

Thus, the magnetic head fixed on the above described arm can not effectively follow the irregularities or oscillation of such high frequency. Further, in the magnetic head and the support mechanism thereof, the proper oscillations appear with a high frequency determined by an elastic constant of the members which constitute the head arm and support mechanism. If the magnetic head can not fairly follow the oscillations, such as described above, signal voids would appear in the signal recorded on and reproduced from the magnetic medium. In addition, the surface of the magnetic medium may be damaged by the tip of the magnetic head.

Therefore, it is a general object of the present invention to provide a novel and useful magnetic head assembly which has overcome the disadvantages, as heretofore described.

Another object of the present invention is to provide a magnetic head assembly which can accurately follow, at high speed the space variation between a magnetic head core tip and a magnetic medium. Here an object is to maintain a constant and fair contact between the tip and a magnetic medium, thereby effecting a stable recording and reproducing operation.

Still another object of the invention is to provide a magnetic head assembly which enables the magnetic head core to follow and contact the magnetic medium, constantly and accurately, under a definite pressure. Another object is to perform a stable recording and reproducing operation without causing signal voids or damage to the magnetic surface.

A further object of the invention is to provide a magnetic head assembly in which the magnetic head core can follow, effectively and accurately, the high frequency oscillation on the rotary magnetic medium surface.

A still further object of the invention is to provide a magnetic head assembly in which two cores and one core dummy are employed to constitute a three-point support mechanism for making a full and stable contact of the cores with the magnetic medium.

Additional objects and features of the invention will become apparent from the description set forth hereafter when considered in conjunction with the accompanying drawings, in which.

Figure 1:
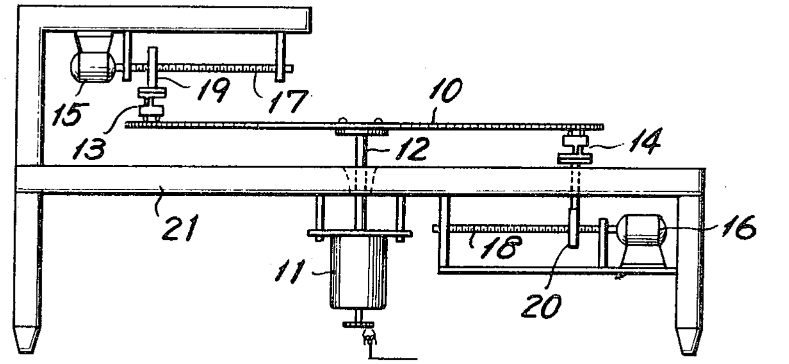
FIG. 1 is a side view of an embodiment of a rotary magnetic disk type recording and reproducing apparatus in which a magnetic head assembly, according to this invention, can be applied.
Figure 2:
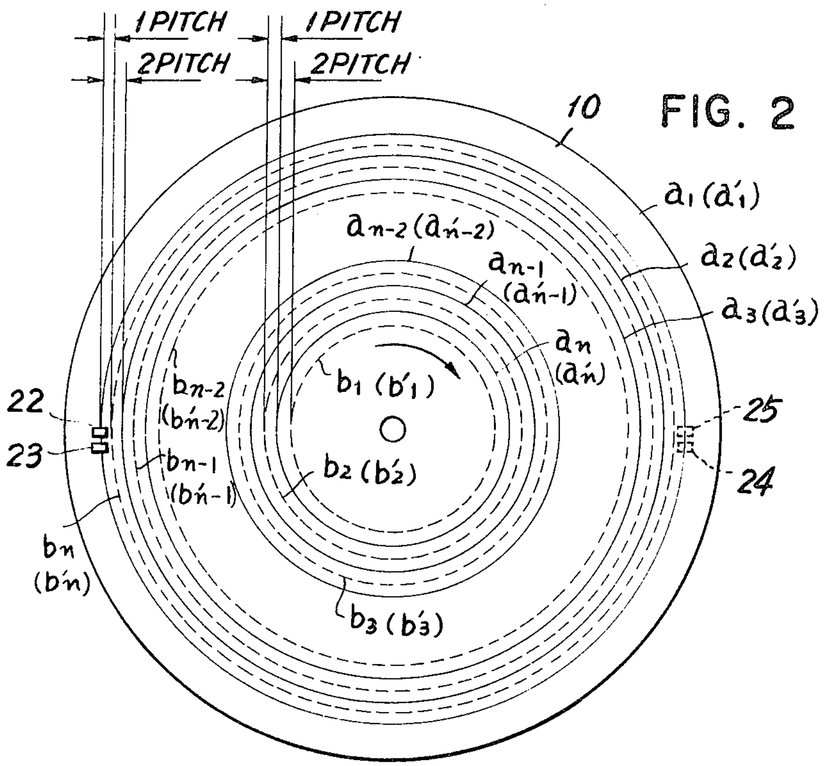
FIG. 2 is a plan view illustrating a magnetic track pattern on a surface of the magnetic disk.

Referring now to FIGS. 1 and 2, a rotary magnetic disk type magnetic recording and reproducing apparatus is briefly described. According to the invention, the apparatus employs a magnetic head assembly. A rotary magnetic disk 10, made of a rigid body, has magnetic surfaces formed by magnetic plating on upper and lower surfaces. The magnetic disk 10 is secured to a rotary shaft 12 of a disk motor 11. Magnetic head cores of the magnetic head assemblies 13 and 14 make contact with both magnetic surfaces of the magnetic disk 10. The disk motor 11 is fixed on the lower surface of a table 21. The magnetic disk 10 is rotated at a speed of 60 revolutions per second by the motor 11. The motor 11 rotates in synchronism with a vertical synchronizing signal of a video signal which is to be recorded on the disk. The magnetic head assemblies 13 and 14 are, respectively, supported by head supports 19 and 20. The head supports 19 and 20 have, respectively, half nuts fitted to feed screws 17 and 18 which are directly connected to rotary shafts of pulse motors 15 and 16.

According to this embodiment of the present invention, the rotary shafts 17, 18 rotate by 15° responsive to each input pulse. The rotary angle results from each single step of the intermittent rotations of the pulse motors 15 and 16. The apparatus is arranged so that the magnetic head assemblies 13 and 14 are moved in two track pitches over the surface of the magnetic disk 10 responsive to the rotation of the screws 17, 18 through an angle of 60°, corresponding to four steps of the pulse motor. Accordingly, the magnetic head assemblies are respectively moved in two track pitches by four pulses and in one track pitch by two pulses.

A recording and reproducing magnetic head 22 of the magnetic head assembly 13 records one field or frame of the video signal on a track $a_1$, as shown in FIG. 2, during one rotation of the magnetic disk 10. Following this, a recording and reproducing magnetic head 24 of the magnetic head assembly 14 makes a similar recording on a track $a_1'$, on the lower surface of the magnetic disk 10. During the recording by the magnetic head 24, the pulse motor 15 rotates through 60°, and the magnetic head assembly 13 steps forward in the radial direction in two track pitches toward the inner periphery of the magnetic disk. In the present embodiment, one track pitch is determined at 130$\mu$. Following the recording by the magnetic head 24, the magnetic head 22 makes another recording on a track $a_2$, and the magnetic head assembly 14 steps forward in two track pitches. In this manner, the magnetic head assemblies 13 and 14 step forward alternately and intermittently. When they reach tracks $a_n$ and $a_n'$, they step forward one more track pitch and reach tracks $b_1$ and $b_1'$ on the innermost end. After reaching the tracks $b_1$ and $b_1'$, the magnetic head assemblies 13 and 14 are reversed in their direction, and they intermittently step forward in every two track pitches. Therefore, responsive to movement of the heads in the reverse directions, the tracks $b_1(b_1')$—$b_n(b_n')$ of the magnetic heads are formed between the tracks $a_1(a_1')$—$a_n(a_n')$, made when the heads move in the forward direction. The reverse tracks are thus mutually spaced in alternate arrangement on the magnetic disk. The magnetic head assemblies 13 and 14 continue to step forward by one track pitch and reach the tracks $a_1$ and $a_1'$ when they reach the outermost peripheral edge of the magnetic sheet. Reaching to the tracks $a_1$ and $a_1'$, erasing magnetic heads 23 and 25 erase the recorded signal prior to recording. Then the magnetic heads 22 and 24 record a new video signal, stepping forward intermittently. The mode of operation as described applies also to the reproducing operation.

Figure 3I:
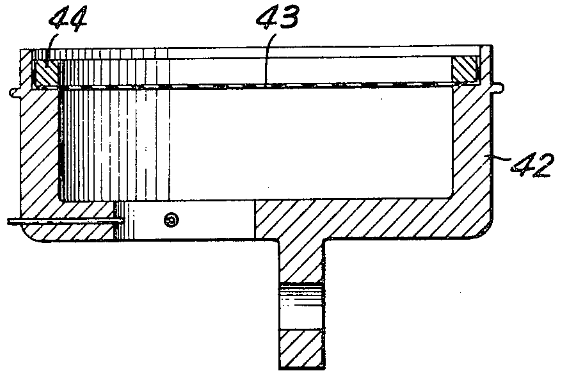
FIGS. 3A to 3N and 3P are a series of views respectively illustrating the assembling procedure of an embodiment of the magnetic head assembly according to the invention.
Figure 3J:
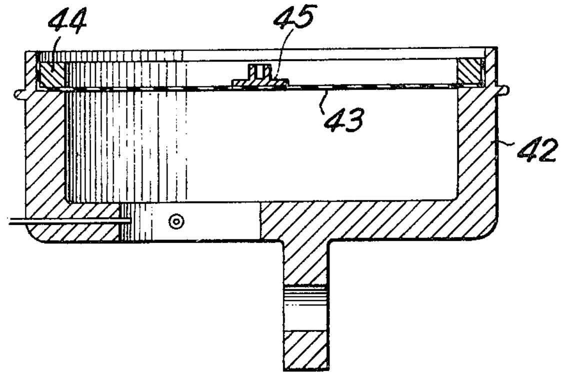
Figure 3K:
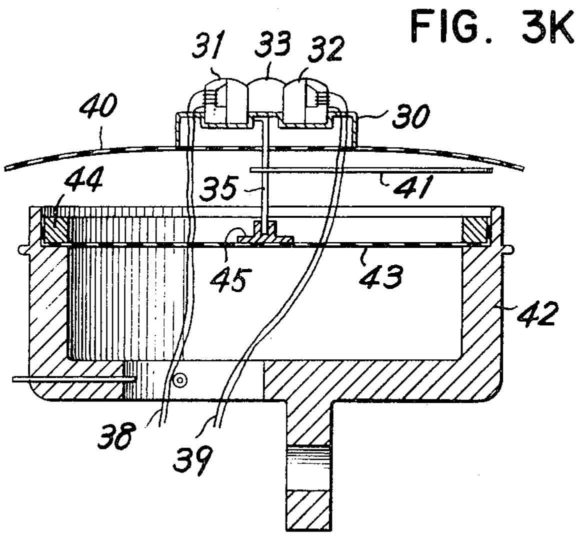
Figure 3L:
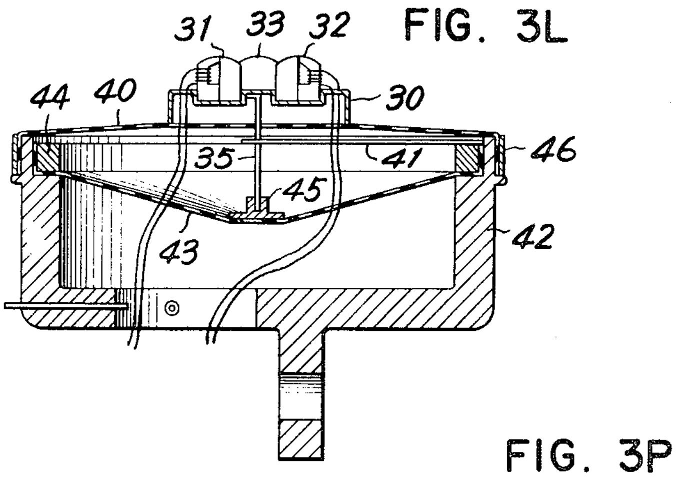
Figure 3P:
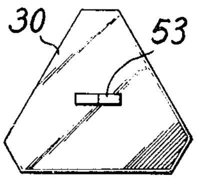

FIGS. 3A to 3P are now referred to for illustration of an embodiment of the magnetic head assemblies 13 and 14 of the invention. The procedures for assembling the magnetic head are hereinafter described.

As shown in the plan view of FIG. 3A, two cores 31 and 32 and a core dummy 33 are attached on a titanium base plate 30. The base plate 30 is of a triangular shape and light in weight. The cores 31 and 32 are disposed in alignment in a straight line. The cores 31 and 32 and the dummy 33 are disposed at the apexes of an imaginary triangle, shown by broken lines on the base plate 30. Further, the cores 31 and 32 and the dummy 33 are adjusted to have their tips properly disposed in the same plane. The core 31 serves for recording and reproducing and the core 32 for erasing purpose. The gap width (track width) of the core 32 is appreciably larger than the gap width of core 31. The cores 31 and 32 and the dummy 33 may be made of the same material so that they will wear uniformly. However, the dummy 33 may also be made of a highly wear-resistant material such as a ruby, sapphire, or like material. The cores 31 and 32 should have a width of about 1.5 mm and height of about 1.2 mm, and be light in weight. Also the titanium base plate 30 should be light in weight. The overall magnetic head block, comprising the base plate 30, cores 31, 32 and dummy 33, should preferably have light weight.

As shown in the vertical section view of FIG. 3B, the lower portions of the cores 31 and 32 are cemented to the base plate 30 with an adhesive agent 34. As shown in FIG. 3C, a center pole 35 is fixedly cemented in the middle of and vertically to the base plate 30. The cores 31 and 32 are then wound with coils which are, respectively, formed in a recording and reproducing coil 36 and an erasing coil 37, as shown in FIG. 3D. Thereafter, these coils 36 and 37 are given a varnish treatment. Each of lead wires 38 and 39 extends downwardly through the base plate 30.

As shown, respectively, in FIGS. 3E and 3F in vertical side and plan views, the center pole 35 and lead wires 38 and 39 pass through an upper rubber film 40. Thereafter the edge of the base plate 30 is cemented to the upper surface of the rubber film 40. This rubber film 40 is a thin membrane of a thickness about 20 – 50$\mu$ having proper resiliency and consisting of natural rubber or urethane synthetic rubber.

After that, as shown by vertical side and bottom views respectively in FIGS. 3G and 3H, the center pole 35 is cemented to an end of an anchor 41 of a plate form. The anchor 41 must be attached in parallel with the upper surface of the base plate 30. The anchor 41 prevents the base plate 30 with the cores from being pulled in one direction by the frictional force generated between the magnetic disk 10 and the cores 31 and 32 and dummy 33 during operation of the magnetic head. Therefore, the anchor 41 must be provided in a position parallel to a line connecting the cores 31 and 32 and extending toward the erasing core 32 side.

On the other hand, as shown by vertical section in FIG. 3I, a head holder casing 42 is provided with a lower rubber film 43 in uniform tension. The rubber film 43 is similar to the rubber film 40. An intermediate ring 44 is fitted to the casing 42 to fix the rubber film 43 therewith. As shown in FIG. 3J, at the middle of the rubber film 43, a rubber film of a thickness 0.04 mm is laid in double layer and a center guide 45 is cemented thereon.

Then, as seen in FIG. 3K, the lower end of the center pole 35 is fitted to and supported by the center guide 45 which, in turn, is fixed on the lower side rubber 43 in the casing 42. The lead wires 38 and 39 are passed through the rubber film 43 and taken out from underside of the rubber film 43. Thereafter, as seen in FIG. 3L, the forward end of the anchor 41 is cemented to the upper surface of the intermediate ring 44. The upper rubber film 40 coveres on the peripheral edge of the casing 42. The rubber film 40 is rigidly secured from outside the casing by an outer peripheral ring 46. In this state, as shown in the figure, the center pole 35 tensions the rubber film 43 to an upper condition and the rubber film 40 to a lower condition. The rubber films 40 and 43 form a drum shape with a casing 42.

Figure 3M:
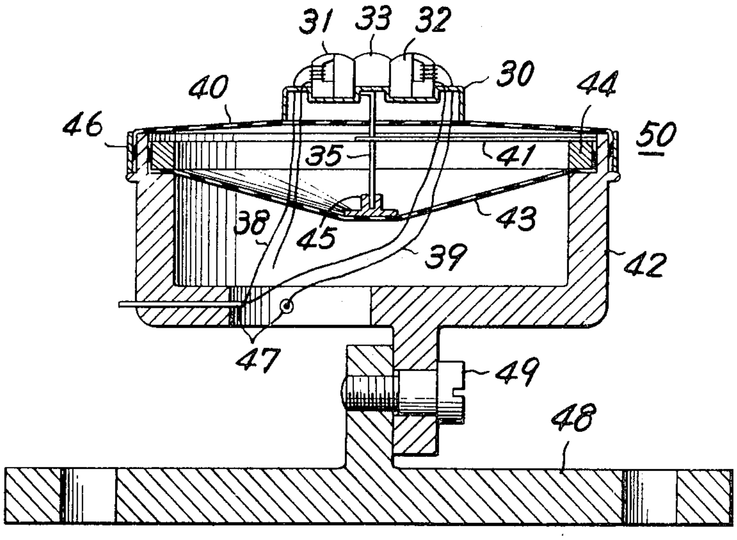

The lead wires 38 and 39, as shown in FIG. 3M, are soldered to terminals 47 which are provided on the casing 42. The above assembled casing 42 is attached to a fixing bracket 48 with a screw 49. Thus a magnetic head assembly 50 is finally obtained. Upon attachment of the screw 49, the inclination of casing 42 may be adjusted so that the cores 31 and 32 and dummy 33 will respectively contact the magnetic disk under the same contact pressure. The thus obtained magnetic head assembly 50 can be used as the magnetic head assemblies 13 and 14 as shown in FIG. 1. In this instance, the cores 31 and 32 are wound with coils which correspond respectively to the recording and reproducing magnetic heads 22, 24 and the erasing magnetic heads 23, 25.

In associating the magnetic head assembly 50 with a rigid magnetic disk having ground surfaces, the space between the rubber films 40 and 43 may be left vacant, as hereinabove described.

Figure 3N:
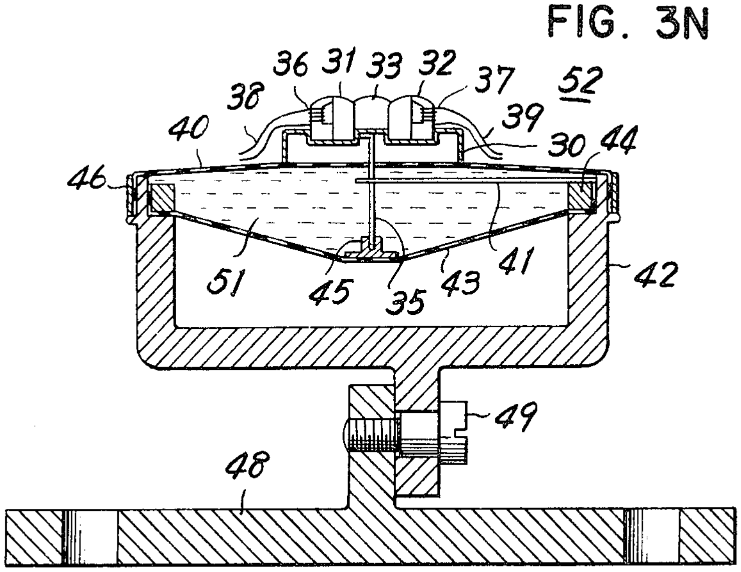
Figure 4:
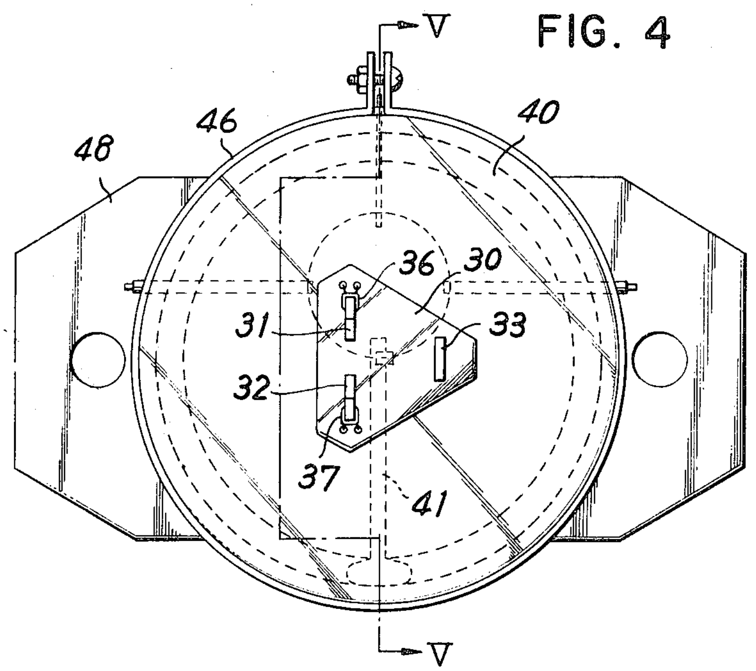
FIG. 4 is a plan view of the magnetic head assembly after it has been assembled.
Figure 5:
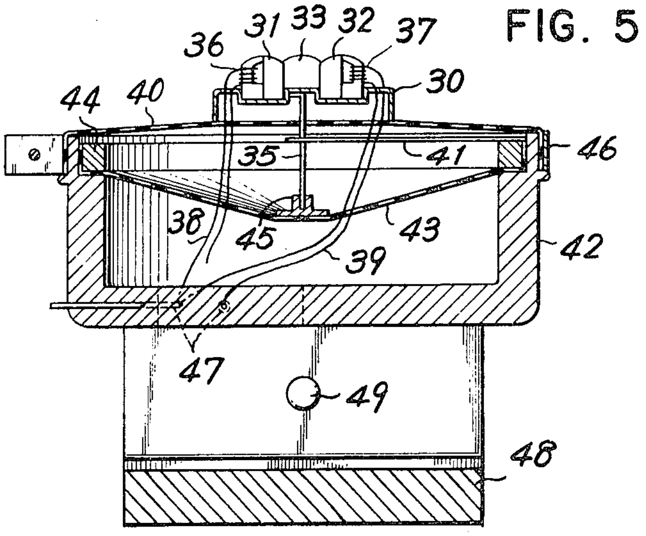
FIG. 5 is a vertically sectioned side view of the assembly taken along the line V—V of FIG. 4.

An enlarged front elevation view of the magnetic head assembly 50 assembled as hereinbefore described is shown FIG. 4. Its vertical side elevation view taken along the line V—V, is shown in FIG. 5. Throughout FIGS. 3, 4 and 5, the identical parts are denoted by the identical numerals, and the detailed description thereof is omitted.

In accordance with the magnetic head assembly 50 of the invention, the magnetic head cores 31 and 32 can follow a large surface oscillation having a vertical amplitude in the order of about several $\mu - 1$ mm. These oscillations are caused from rotation of the magnetic disk 10, and the waveform-like irregularities on the disk surface. The following by the cores 31 and 32 is attained by the resiliency of the rubber films 40 and 43. In consequence, an excellent damping effect of the oscillation and irregularities can be obtained. Contact pressure of the magnetic head cores 31 and 32 against the magnetic disk 30 may be as small as 1 – 3 gr. Thus, the magnetic cores can very stably make contact with the magnetic medium. This contact pressure may desirably be less than 1.5 gr. The cores 31 and 32 and dummy 33 constitute a three-point support mechanism so that the cores 31 and 32 can be stably supported on the magnetic disk 10.

When the magnetic head assembly is specifically used for cooperating with a flexible magnetic sheet, it is desirable to employ a magnetic head assembly 52 assembled as shown in FIG. 3N. Upon assembling the magnetic head assembly 52, a damping material 51 is enclosed between the rubber films 43 and 40 before sealing the upper surface of the casing 42 with the rubber film 40 as shown in FIG. 3L. The damping material 51 may preferably be silicone oil having proper viscosity. An adequate viscosity for the silicone oil may be, for example, about 10,000 – 50,000 cSt (centi Stokes). Also, the rubber films 40 and 43 are about 40 – 100 $\mu$ in thickness. Their diameters are about 9 – 19 $\phi$/mm. In order to prevent a leaking of the silicone oil from between the rubber films 43 and 40, the lead wires 38 and 39 may be extended over the rubber film 40 instead of passing through the base plate 30 and rubber films 40 and 43.

Figure 6A:
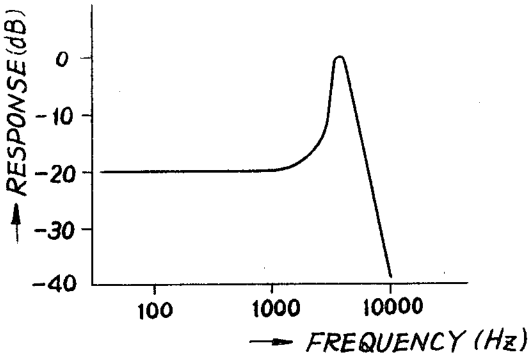
FIGS. 6A and 6B are diagrams showing the frequency characteristics, respectively, of a conventional magnetic head and an embodiment of the magnetic head assembly of the invention.
Figure 6B:
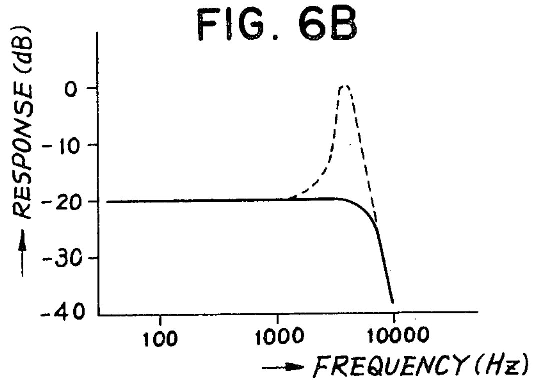

The inherent resonance in the portion consisting of cores 31 and 32, dummy 33 and base plate 30, and rubber films 40 and 43 is damped by the damping material 51. In the conventional magnetic head, as shown in FIG. 6A, the abnormal resonance is produced in a frequency higher than 1 KHz by the oscillation of the rotary magnetic medium and variation in the space between the head and the magnetic medium. A peak is produced at a resonance point in the frequency characteristic. However, the magnetic head assembly 52 does not produce a resonance point peak in the frequency characteristic. The heads have a flat frequency characteristic as shown in FIG. 6B.

In both embodiments, as described above, the base plate 30 is provided with the cores 31 and 32 and dummy 33 thereby forming a three-point support mechanism. From this three-point support mechanism, for example, the dummy 33 may be omitted and only the cores 31 and 32 may be provided. Further, as shown in FIG. 3P, the titanium base plate 30 may have a single core 53 for the recording and reproducing action or for the erasing action. In this instance also the invention may have all other parts quite the same as in the abovementioned embodiments.

Throughout the above embodiments, it is noted that the magnetic head assembly cooperates with the rotary magnetic medium. However, the invention will not be confined merely to the construction as described. The magnetic head assembly may be attached to a rotary body for rotating and cooperating with a running magnetic tape or the magnetic head assembly may be fixed for cooperating with the magnetic tape in running.

Furthermore, this invention is not limited to these embodiments but various variations and modifications may be made without departing from the scope and spirit of the invention.

What we claim is:

1. A magnetic head assembly comprising a magnetic head holder casing, a first resilient film-like member, a core support base provided on the first resilient member, at least one head core supported on the base, said core having windings, means for holding the first resilient member in tension over the holder casing, a second resilient film-like member held in tension in the holder casing, a support member standing upright between the first and the second resilient members held in tension in the holder casing, said first and said second resilient members being held in opposing tension opposite each other and spaced apart by the support member, said base being attached to said film for allowing the core to move in a vertical direction relative to the surface of the resilient member, thus making said core able to follow variations of contact on a magnetic surface of a magnetic medium.

2. The magnetic head assembly of claim 1 in which said support member is slightly longer than the space between the first and the second resilient members and extends between middle portions respectively of the first and the second resilient members.

3. The magnetic head assembly of claim 1 which further has a damping means filling the space between the first and the second resilient members.

4. The magnetic head assembly of claim 3 in which said damping member is silicone oil having appropriate viscosity.

5. A magnetic head assembly comprising a magnetic head holder casing, a first film-like resilient member held in tension over the holder casing, a core support base, at least one head core supported on the base, said core having windings applied thereto, a second film-like resilient member held in tension in the holder casing, and means for holding said first and second resilient members on the holder casing in opposite and spaced apart relationship with respect to each other, said core base being attached to said first resilient member for enabling the core to move in a vertical direction relative to the surface of the first resilient member and to follow variations of contact between said core and a magnetic surface of a magnetic medium.

6. The magnetic head assembly of claim 5 which further comprises a silicone oil filling the space between said first and second resilient members, said silicone oil having a viscosity of 10,000 – 50,000 centi Stokes and said first and second resilient members having a thickness of 40 – 100 $\mu$.

7. The magnetic head assembly of claim 5 in which at least said one head core comprises a recording and reproducing core, an erasing core and a dummy core, said recording and reproducing core and said erasing core being disposed on the core base to trace the same track on said magnetic medium, and said dummy core being disposed on the core base at an apex of an imaginary triangle formed with the other two apexes at the locations of said recording and reproducing core and erasing core.

8. The magnetic head assembly head assembly of claim 5 which further comprises a damping member filling the space between said first and second resilient members.

9. The magnetic head assembly of claim 8 in which said damping member is silicone oil having appropriate viscosity.

10. A magnetic head assembly comprising a magnetic head holder casing, a first film-like resilient member held in tension over the holder casing, a second film-like resilient member held in tension in the holder casing, a core support base on the first resilient member, at least one head core supported on the base, said core having windings applied thereto, means for holding the first and second resilient members in tension on the holder casing for allowing the core to move in a vertical direction relative to the surface of the first resilient member, and a support member upright between the first and the second resilient members held in tension by the holder casing, said core being capable of following variations of contact between said core and a magnetic surface of a magnetic medium, said first and second resilient members being held in tension in a drum-like manner opposite each other and spaced apart by said support member.

11. The magnetic head assembly of claim 10 in which said support member is slightly longer than the space between the first and second resilient members and is positioned between the middle portions respectively of the first and the second resilient members.

12. The magnetic head assembly of claim 10 which further comprises a damping member filling the space between said first and second resilient members.

13. The magnetic head assembly of claim 12 in which said damping member is silicone oil having appropriate viscosity.

* * * * *